(12) United States Patent
Midtun et al.

(10) Patent No.: US 9,344,291 B2
(45) Date of Patent: May 17, 2016

(54) CONFERENCING SYSTEM WITH CATCH-UP FEATURES AND METHOD OF USING SAME

(71) Applicants: James Dean Midtun, Chandler, AZ (US); Chyi Pin Lim, Chandler, AZ (US)

(72) Inventors: James Dean Midtun, Chandler, AZ (US); Chyi Pin Lim, Chandler, AZ (US)

(73) Assignee: Mitel Networks Corporation, Ottawa (CA)

( * ) Notice: Subject to any disclaimer, the term of this patent is extended or adjusted under 35 U.S.C. 154(b) by 396 days.

(21) Appl. No.: 13/869,704

(22) Filed: Apr. 24, 2013

(65) Prior Publication Data

US 2014/0320588 A1 Oct. 30, 2014

(51) Int. Cl.
*H04L 12/18* (2006.01)
*H04N 7/15* (2006.01)
*H04M 3/56* (2006.01)

(52) U.S. Cl.
CPC ............ *H04L 12/1895* (2013.01); *H04N 7/155* (2013.01); *H04M 3/567* (2013.01)

(58) Field of Classification Search
None
See application file for complete search history.

(56) References Cited

U.S. PATENT DOCUMENTS

| 8,121,277 | B2 | 2/2012 | Baird |
|---|---|---|---|
| 2004/0207724 | A1 | 10/2004 | Crouch et al. |
| 2005/0216549 | A1 | 9/2005 | Amano et al. |
| 2006/0020665 | A1* | 1/2006 | Hagale ............. H04L 29/06027 709/204 |
| 2008/0137558 | A1* | 6/2008 | Baird ............................ 370/260 |
| 2009/0196575 | A1* | 8/2009 | Masuo ............................ 386/80 |
| 2010/0125791 | A1* | 5/2010 | Katis et al. .................... 715/716 |
| 2010/0245536 | A1 | 9/2010 | Huitema et al. |
| 2012/0173624 | A1 | 7/2012 | Beerse et al. |
| 2013/0297706 | A1* | 11/2013 | Arme et al. ................... 709/206 |
| 2014/0033073 | A1* | 1/2014 | Pegg ............................ 715/753 |

* cited by examiner

Primary Examiner — Simon Sing
Assistant Examiner — Jeffrey Lytle

(57) ABSTRACT

A conferencing system and method that allows participants to review recorded conference information and to join the conference live are disclosed. Exemplary systems and methods continuously record or buffer at least a portion of a conference, such that participants joining late or that otherwise miss a portion of the conference can review a recording of the portion of the conference and catch up to the live portion of the conference.

20 Claims, 4 Drawing Sheets ced speed to

CONFERENCING SYSTEM WITH CATCH-UP FEATURES AND METHOD OF USING SAME

FIELD OF THE INVENTION

The present disclosure generally relates to conferencing systems and methods. More particularly, the disclosure relates to conferencing systems and methods that allow conference participants to review previously-recorded portions of the conference and to join the conference live.

BACKGROUND OF THE INVENTION

A participant to an audio conference or a videoconference may join the conference after the conference has started or otherwise miss a portion of the conference. When the participant joins or rejoins such a conference, the participant may desire to review the portion of the conference that the participant missed prior to joining the real-time or live conference.

Various conference systems allow a participant to listen to a recorded portion of a conference at an accelerated speed to enable the participant to listen to recorded and missed portions of the conference and get caught up prior to joining the live conference. Unfortunately, these systems generally do not allow conference participants to view a status (e.g., live mode or catch-up mode) of the other participants. Further, such systems generally do not allow a participant to request that all participants in catch-up mode join the conference live during designated portions of the conference. With previous systems, a participant, such as a conference leader might try to contact participants in catch-up mode through other, out-of-band means, to request that the participants in catch-up mode join the conference live. Or, the live participants would simply have to wait for the participants in catch-up mode to catch up to the live portion of the conference. In either case, the live participants generally would not know which participants are in catch-up mode or how far behind the participants in catch-up mode are from the participants in live mode.

Also, such systems generally do not allow participants to bypass portions of the recorded conference by skipping material based on, for example speaker and/or topic. Rather, typical systems allow users to catch up by bypassing pauses or periods of silence and by reviewing information at an increased playback speed. The speed is generally selected from a predetermined list of playback speeds and not based on an amount of catch-up time required by a participant.

Nor do typical systems designate portions of the recorded conference as sections that should be reviewed by all or some participants prior to those participants joining the live conference. Rather, all participants would typically have to be live to hear or view required information.

Because of the above-mentioned and other deficiencies, improved conferencing systems and methods that allow participants to review recorded conference information and to join the conference live are desired.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The disclosure provides conferencing systems and methods that allow participants to review previously recorded portions of a conference and to catch up to or jump to the live or real-time portion of the conference. The systems and methods described herein can be used for audio conferencing or videoconferencing. As set forth in more detail below, the systems and methods described herein offer several advantages over and address many of the shortcomings of previous conferencing systems with catch-up features.

By way of examples, the systems and methods of various embodiments of the disclosure provide an indication to participants of which other participants are attending the conference in live mode and which participants are in catch-up mode. For those participants in catch-up mode, the systems and methods may further indicate how far behind or what sections or portions of the previously-recorded portions of the conference the participants that are in catch-up mode are currently reviewing. Various embodiments of the systems and methods described herein allow a participant, such as a conference leader, conference moderator, or other participant, to request that or to force some or all participants, including those in catch-up mode, join the conference live. Additional exemplary embodiments allow a participant in catch-up mode to skip portions of the prerecorded conference by skipping over portions designated by topic, speaker, importance, or the like, which may be in addition to skipping over pauses and periods of silence. In accordance with various aspects of these embodiments, the system includes a graphical representation, such as part of a graphical user interface, to assist a participant in catch-up mode by identifying portions of the previously recorded conference by, for example, keyword, speaker, active speaker, topic, importance, or the like, such that the participant can rapidly review or skip over topics or speakers of lesser interest or importance.

Figure 1:
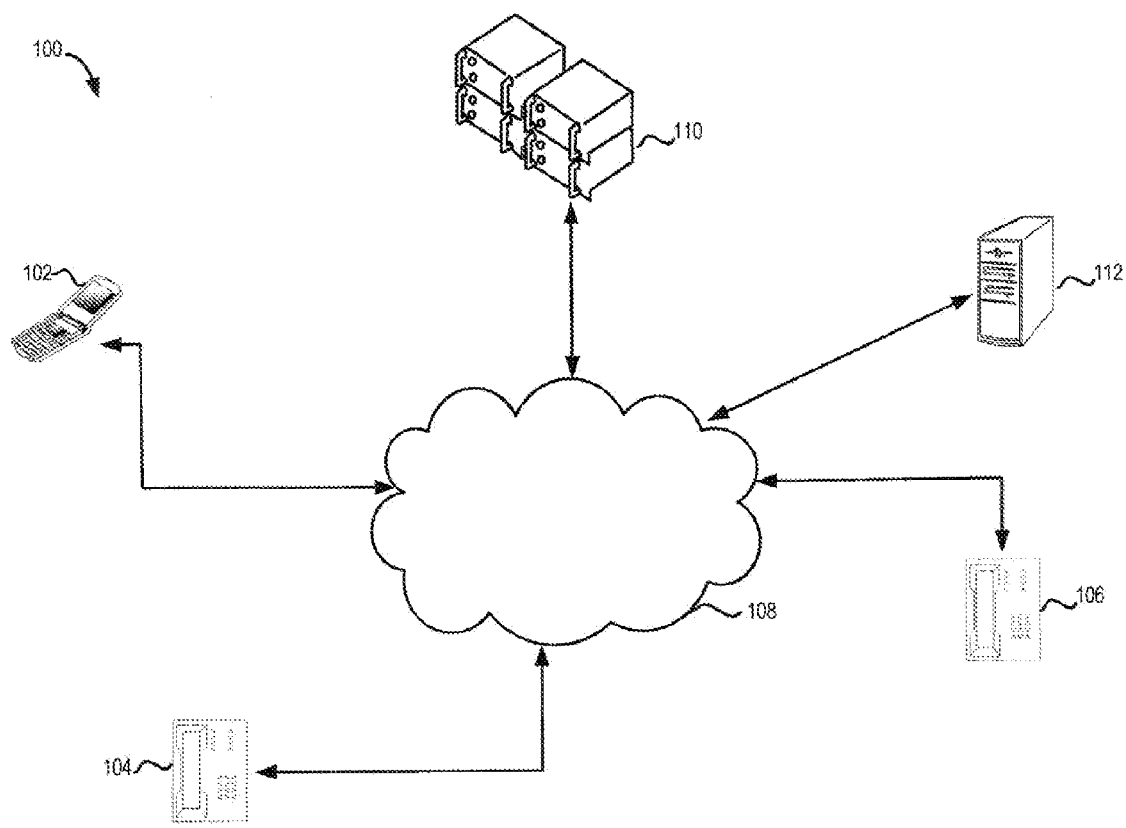
FIG. 1 illustrates a communication system in accordance with various exemplary embodiments of the disclosure.

FIG. 1 illustrates an exemplary system 100 in accordance with various embodiments of the disclosure. System 100 includes a first communication device 102, a second communication device 104, and a third communication device 106 in communication with a network 108. In the illustrated example, system 100 also includes a conferencing system 110 and a recording server 112. Although illustrated as separate from network 108, one or more devices 102-106, conferencing system 110, and/or recording server 112 may form part of network 112.

As set forth in more detail below, system 100 may include one or more applications to perform various functions. As used herein, the term "application" refers to coded instructions executable by a processor that can be used to perform singular or multiple related tasks. For example, an application may include enterprise software, graphic players, media players, or any other suitable software, and combinations thereof. The application may be an independently operable application or form part of another application. By way of one example, the application is part of an enterprise system, which can be accessed within the enterprise system, but which can also operate independently of the enterprise system. The application may interact with or include a client or web plug-in as set forth in more detail below. Although "application" is used in its singular form, the term application, as used herein, may include multiple parts, which may reside on various devices or systems of system 100.

In operation, conferencing system 110 connects two or more devices 102-106, e.g., over network 108, to a videoconference or an audio conference and server 112 buffers at least a portion of the conference, such that participants using one or more devices 102-106 can review a buffered portion of the conference if they join the conference after the conference started, wish to review a previously recorded portions of the conference, or otherwise miss a portion of the conference.

A conference may be scheduled by a participant or another using the application described herein or a scheduling application. A participant may be designated as a conference leader or conference moderator and have additional privileges, as set forth below, relative to other participants.

Referring again to FIG. 1, devices 102-106 may include any suitable communication device. Although illustrated with three devices 102-106, system 100 may include any suitable number of devices, e.g., two or more communication devices. In the illustrated example, device 102 is coupled to network 108 using wireless technology and devices 104 and 106 are wired to network 108. However, devices, such as devices 102-106 may be all mobile devices, all stationary or wired devices, or any combination of wired, mobile, and stationary devices and may be connected to network 108 by any suitable wireless or wired medium. Devices 102-106 may include smart phones, tablet computers, personal digital assistants, phones, personal computers, video and/or audio appliances, televisions or monitors, or any other device suitable for communication using system 100. By way of examples, devices 104, 106 may be telephones wired to a network and device 102 may be a smartphone running Android, iOS, Windows, Symbian, Blackberry OS, Linux operating systems, or similar operating systems, and other devices, not illustrated, may include personal or tablet computers.

In accordance with exemplary embodiments of this disclosure, at least one device 102-106 includes a client or a web plug-in comprising a graphical user interface that indicates a status of one or more other conference participants to show whether the one or more other participants are participating in a live more or a catch-up mode to the conference, that allows a participant to review information relating to the conference and catch up to a live mode of the conference by bypassing selected information, and/or provides other features as described herein. Exemplary graphical user interfaces are described in more detail below in connection with FIGS. 3 and 4.

Network 108 may include an internet protocol (IP) network, a local area network (LAN), a wide area network, a personal area network, a campus area network, a metropolitan area network, a global area network, which may use various types of media (fiber optics, copper, electromagnetic field) or the like to connect to other systems, networks, or the like. Network 108 may be coupled to devices 102-106 and/or other devices using an Ethernet connection, other wired connections, a Wi-Fi interface, other wireless interfaces, or the like. Network 108 may also be coupled to other networks and/or to other devices typically coupled to networks. By way of one example, network 108 may be coupled to a publically switched telephone network or the internet.

Conferencing system 110 may include any suitable system that connects participants to a videoconference or an audio conference. Exemplary systems include a processor and software and/or firmware to perform various features or functions as described herein. By way of examples, conferencing system 110 includes a private branch exchange (PBX), a Unified Communication (UC) server, a conferencing system, or the like. Conferencing system 110 may run software and/or firmware to connect two or more participants to a videoconference and/or audio conference and to enable the features set forth herein.

Recording server 112 may include any device capable of capturing and recording audio and/or video communication between two or more devices 102-106 coupled to conferencing system 110 during a conference. By way of example, recording server 112 may include a digital audio recorder, a computer, or the like, which includes one or more databases to store the recorded conference information. During operation of system 100, server 112 continually records audio and/or video content between devices (e.g., devices 102-106) that are connected to conferencing system 110 during a conference. Server 112 buffers or stores at least a portion of the conference information. The audio data may be stored in a variety of formations including WAV, AIFF, AU, raw, MP3, AAC, or similar file types if the content is audio only or 3GP, ASF, AVI, MP4, or the like if the content includes video. Further, indicators, for example indicating a speaker, topic, and/or importance of the conference information may be stored in connection with the conference information.

Although illustrated as separate devices or systems, conferencing system 110 and recording server 112 may be part of an integrated system. And, conferencing system 110 and/or recording server 112 may form part of network 108.

Figure 2:
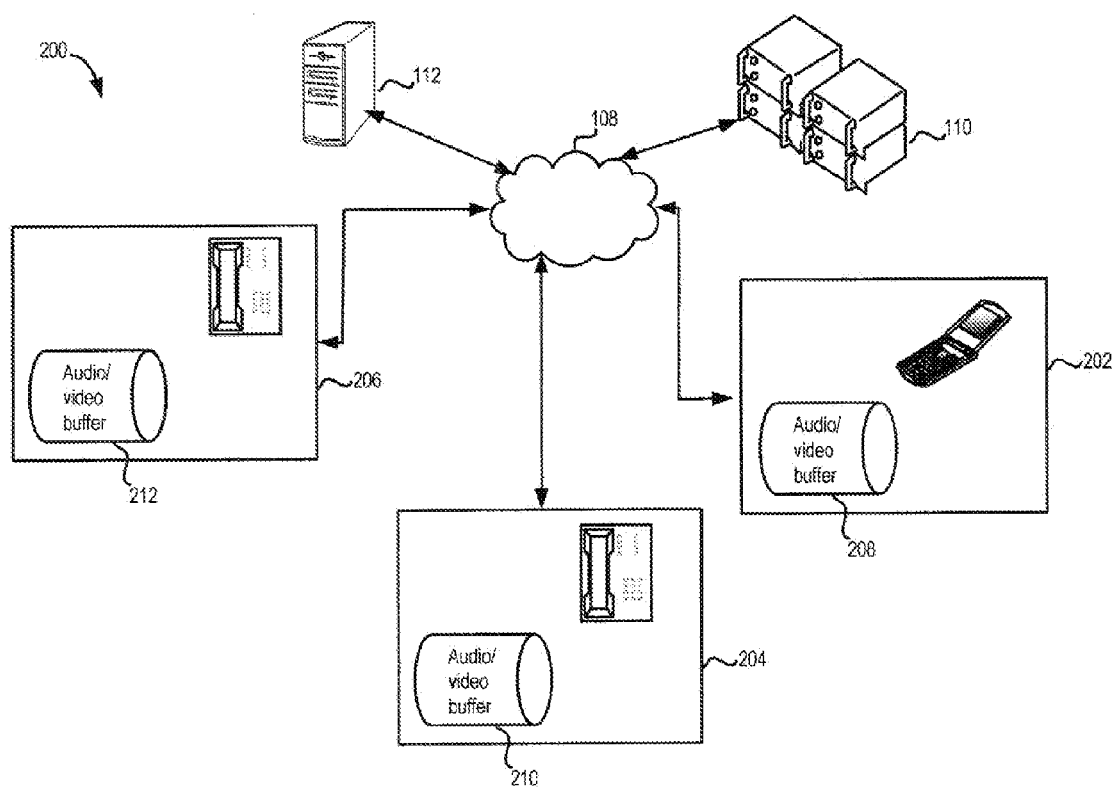
FIG. 2 illustrates a communication system in accordance with additional exemplary embodiments of the disclosure.

FIG. 2 illustrates a system 200 in accordance with additional exemplary embodiments of the disclosure. System 200 is similar to system 100; system 200 includes devices 202-206 coupled to network 108 and optionally includes recording server 112. In the illustrate case, devices 202-206 respectively include audio and/or video recording databases 208-212 to store at least a portion of a videoconference or audio conference between two or more devices coupled to conferencing system 110; optional recording server 112 may also optionally include one or more recording databases to also record at least a portion of a videoconference or audio conference between two or more devices coupled to conferencing system 110. Although illustrated with all devices 202-206 including a database, systems in accordance with this disclosure may include a subset of devices (e.g., one or more devices) that include one or more integrated databases and other devices that use one or more databases on recording server 112.

Systems 100 and 200 allow conference participants that join a conference late, otherwise miss a portion of the conference, or that may want to review a portion of the conference, to review a portion of the conference that has been recorded and, if desired, to catch up to a real-time or live portion of the conference or otherwise join the live conference. In accordance with exemplary embodiments of the disclosure, to allow participants to review a portion of a recorded conference, the system includes an application, such as an enhanced media player, which may be accessed by a participant using a device (e.g., one or more of devices 102-106, 202-206) that may include the application or a client or a web plug to allow participants to access the application to join the conference using their respective devices and to listen to any recorded portions of the conference using various combinations of the features and functions described herein.

In accordance with exemplary embodiments of the disclosure, the application allows a participant to review recorded conference information during the conference and to catch up to the live mode of the conference. In accordance with various aspects of these embodiments, the application allows a participant to play back recorded information at a configurable or predetermined speed (e.g., a rate of 1.5× or 2×).

In accordance with further aspects, the application may provide an assisted catch-up option to improve catch-up times. For example, the application may include a voice analysis of the buffered or previously-recorded portion of the conference to skip over introductions or long periods of silence. The application may also allow a participant reviewing recorded information to skip over or skip to specific active speakers, topics, keywords, topics designated by importance, or the like, in order to more quickly catch up to the live portion or mode of the conference. A participant may use an application with a graphical user interface, such as a visual player (described in detail below) to assist in this skipping desired portions of the recorded conference information. For example, a method of reviewing the recorded information may include a participant listening to a portion (e.g., 10 or 15 seconds) of each speaker or topic before deciding if they want to listen to the entire portion associated with that speaker or topic. In accordance with exemplary aspects of these embodiments, the buffered sections of the conference can be analyzed with voice-recognition software to detect configured keywords. These keywords can then be used as something a participant can search ahead for or provide a richer user interface experience, such as on a visual player, described below. The application may also provide for the active speaker identification to allow a "guess" at when the meeting actually starts. For example, background noise and speaker introductions may be identified using the application, and a participant can skip over the identified sections to reduce an amount of information to be reviewed by the participant. The application may further provide assisted catch up by completely skipping over portions of the recorded conference (i.e., silence) while some sections with lower confidence of non-importance (like introductions) can simply be played at a higher speed, which allows a participant to get the idea of the discussion, in playback mode at increased speed. This can be done automatically by the application or with participant-specified options, such as designated playback speed for portions of the recorded conference with lower confidence of non-importance.

The application may additionally or alternatively allow a participant or conference leader to set a hard limit on the amount of catch-up time allowed. This allows a leader, a participant joining a conference late, or a participant who otherwise missed a portion of the conference to set a maximum allowed catch-up time before joining the conference live. For example, a maximum catch-up time may be set to five or ten minutes, and then a playback speed of the recorded information is adjusted (e.g., automatically by the application) to playback the missed or important, missed portions of the recorded conference information within the allotted maximum catch-up time. An amount of time to be caught up may be used by the application to set the playback speed as well as determine portions of the recorded information the application skips over during playback, even with a lower confidence of the importance of sections or portions that the application skips over. A leader or moderator of the conference may set this defined time for all participants in a call or participants may select the maximum catch-up time.

In accordance with exemplary embodiments of the disclosure, a graphical user interface on a participant device indicates a status of one or more participants (e.g., participants on other devices) to indicate which participants are live and/or which participants are reviewing previously recorded information, and optionally for those participants reviewing previously-recorded information—i.e., catching up to the live portion of the conference—how far behind the various participants in catch-up mode are relative to the live mode of the conference.

Figure 3:
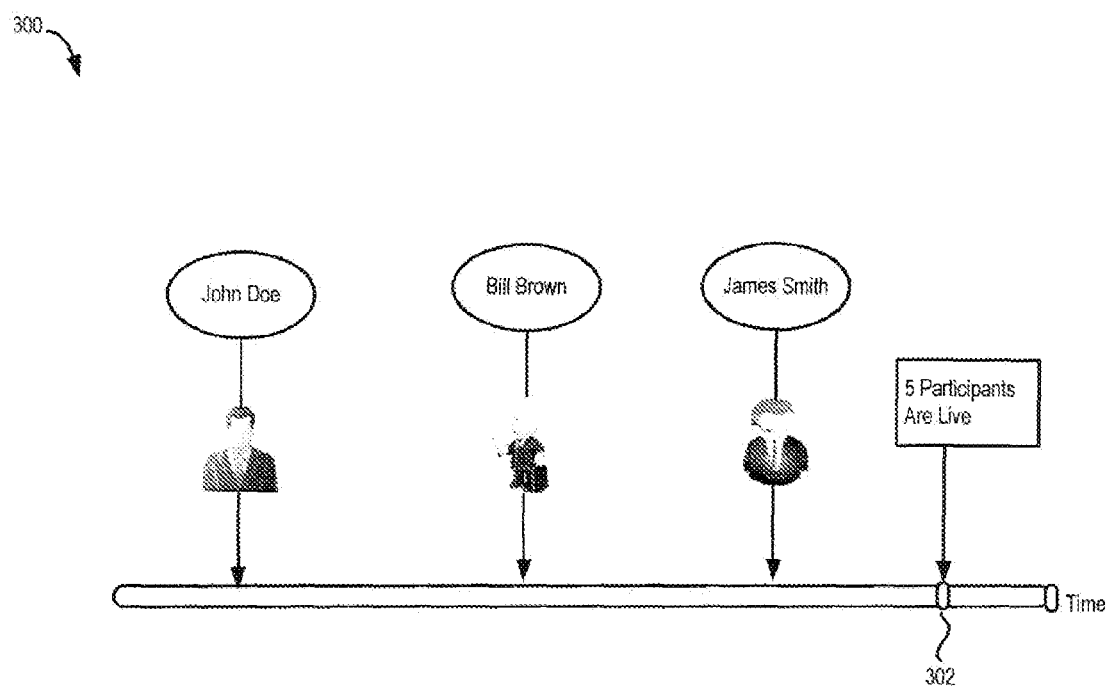
FIG. 3 illustrates an exemplary graphic user interface in accordance with exemplary embodiments of the disclosure.

FIG. 3 illustrates a graphical user interface, showing that three participants, John Doe, Bill Brown, and James Smith are in catch-up mode and are reviewing previously-recorded conference information and that five other participants are in live mode, indicated at 302. In accordance with exemplary embodiments of the invention, an amount of time that each participant is behind the live session can be viewed using the interface. In accordance with further embodiments, additional information regarding the topics being reviewed by the participants in catch-up mode can be reviewed, e.g., by scrolling over the icons associated with the respective participants or other suitable technique. Similarly, additional information regarding the live participants can be reviewed using the same or similar techniques. Alternatively, the user interface may include an option, which may be configurable, to only show live participants or only show participants in catch-up mode. Additionally or alternatively, participants who are live may be differentiated from participants that are in catch-up mode by using different colors to represent participants in the two modes, by using different symbols for participants in the two groups—e.g., avatar for one group and photographs for another group, or the like, which may be configurable by a participant or leader. This graphical user interface may be associated with a separate icon of a client or web plug-in or may be combined with another set of indicators—e.g., when participants are on a phone line, the status may show "catching up" or "live" for that participant.

In accordance with further exemplary embodiments of the disclosure, a graphical user interface may indicate topics, speakers that have participated in the conference, and or other information. The speaker information may be derived from, for example active speaker information used by conferencing system 110, and topics may be based on speech recognition of the application, a predefined agenda, a real-time agenda, where topic information is added to conference information as the conference proceeds, or the like.

Figure 4:
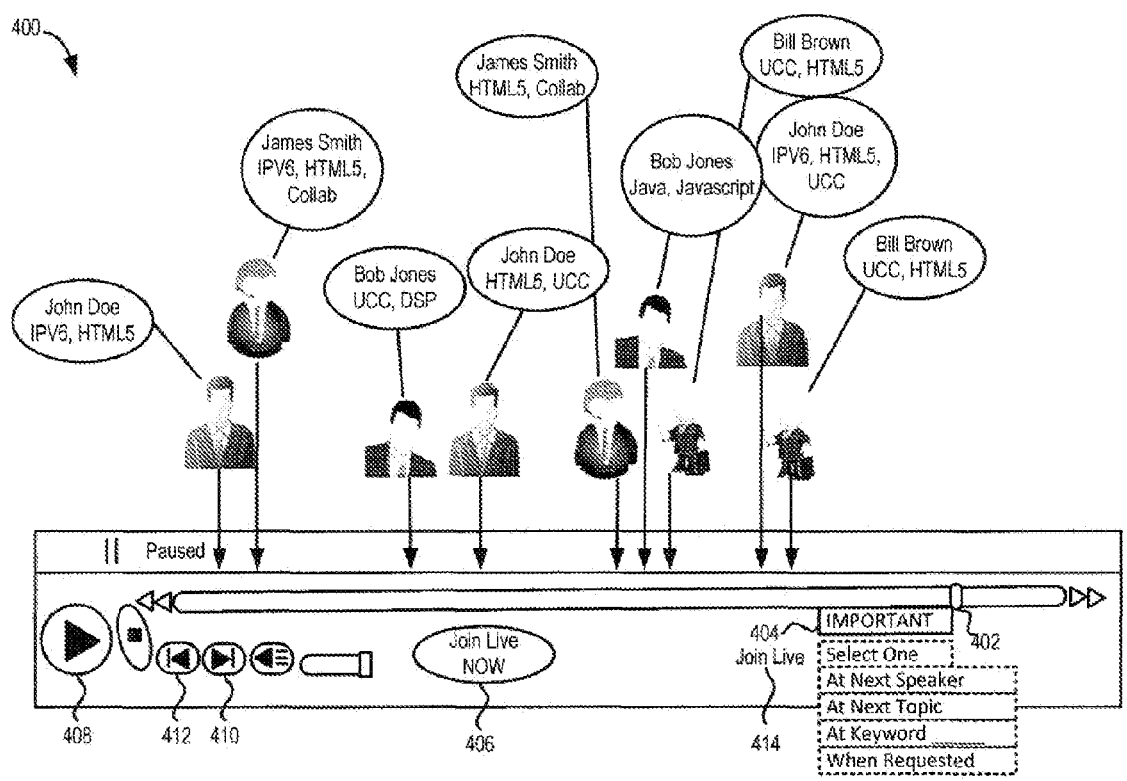
FIG. 4 illustrates another exemplary graphic user interface in accordance with exemplary embodiments of the disclosure.

FIG. 4 illustrates an exemplary graphical user interface 400 suitable for various embodiments of the present disclosure. Exemplary interface 400 includes media player functions to allow a participant to, for example, play (button 408), pause (button 408), fast forward or skip to next portion—e.g., next speaker or topic (button 410), rewind or go to a previous portion, such as a previous portion designated by speaker or topic (button 412), join live now (button 406), or join live at a predefined event 414, such as at the next speaker, at the next portion indicated as "important," at a designated keyword—e.g., entered by a participant in catch-up mode, after reviewing at a particular speed (e.g., 1.5× or 2×), after catching up for a specified period of time (e.g., 5 minutes, 10 minutes, or the like), or similar event. In the illustrated example, John Doe, James Smith, Bob Jones, and Bill Brown are or have been connected to a conference (e.g., using system 100 or 200) and the live portion of the conference is indicated at 402. By way of example, the speaker information and the topic may be automatically pulled and displayed on user interface 400 using system 100 or 200. For example, the speaker information may be pulled using active speaker recognition and the corresponding topic for an active speaker may be pulled using predefined keywords. In the illustrated example, interface 400 allows a participant to skip or jump to a particular speaker or topic associated with the conference—e.g., using button 410. The graphical user interface may additionally indicate areas indicated by a participant as important (e.g., at 404) and may distinctively illustrate portions of the conference that a participant has reviewed and portions that have not been reviewed by the participant—e.g., by using different colors or other indicators to indicate portions that have been reviewed and portions that have not been reviewed.

As noted above, in accordance with exemplary embodiments of the disclosure, the system may allow a conference participant or conference leader to request some or all participants in catch-up mode join the conference in live mode. The system may be configured to automatically connect some (e.g., individually designated or designated by organization, level within an organization, or the like) or all participants in catch-up mode to a live mode when a participant or leader requests that all or designated conference participants be live, or may request that participants join the live mode of the conference by selecting a button, such as button 406. By way of one example, a participant, such as a conference leader, may select a "go live" option using a graphical user interface, and may select that all or designated participants to join the conference live, which may cause the system (e.g., system 100 or 200) to send a message or notification to the requested participants' devices with an option (e.g., a button) to select to go live. Optionally, the message may contain a brief message, such as an explanation for the request. In accordance with various embodiments of the disclosure, once a participant switches from catch-up mode to live mode, the participant's place in catch-up mode is marked, such that the participant can easily return to the recorded location where the participant left off in catch-up mode and continue reviewing the recorded conference information.

In accordance with further exemplary embodiments of the disclosure, the system may be configured to allow a participant, such as a conference leader, to force some (e.g., designated) or all devices connected to the conference to automatically go to live mode, such that the selected or all participants automatically join the conference in live mode once this option is selected. In this case, participants that have been forced to switch from catch-up mode to live mode may receive a message or notification, indicating, for example, why that participant or various participants have been connected to the live mode of the conference and/or who requested the automatic switch to the live mode of the conference. Additionally or alternatively, the system may be configured to allow a participant, such as a leader or conference owner to set an option disallowing non-live participation by all or some of the conference participants.

In accordance with further embodiments of the disclosure, a leader, moderator, or other participant of a conference may mark information as important, which may be optional or mandatory for all or specific participants to review before joining the conference or before joining a live mode of the conference. During the conference, a participant, such as the moderator may also mark a section of the call that they feel important for any late-comers as mandatory catch-up material. This marking may be done using the graphical interface, e.g., of a visual player, as described above.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand alone or combined in any combination. It will be recognized that changes and modifications may be made to the exemplary embodiments without departing from the scope of the present invention. These and other changes or modifications are intended to be included within the scope of the present invention, as expressed in the following claims.

We claim:

1. Apparatus comprising:
    participant devices in communication with
    a conferencing system via a network, the conferencing system being in communication via the network with a plurality of other participant devices to connect the plurality of participant devices to a conference, and
    one or more recording databases, for recording the conference, being in communication via the network,
    wherein the participant devices includes a graphical user interface that indicates a status of one or more of the other participant devices to show whether the other participant devices are participating in a live mode or a catch-up mode to the conference and indicates the portions of the recording that the other participant devices in the catch-up mode are currently reviewing.

2. The apparatus of claim 1, wherein the conference is an audio conference.

3. The apparatus of claim 1, wherein the conference is a videoconference.

4. The apparatus of claim 1, wherein a first participant device transmits a request for one or more other participant devices to join a live mode of the conference.

5. The apparatus of claim 1, wherein the plurality of participant devices comprises the one or more recording databases.

6. The apparatus of claim 1, wherein the one or more recording databases are remote from the plurality of participant devices.

7. The apparatus of claim 1, wherein the graphical user interface further displays conference information selected from one or more of the group consisting of topic, speakers, active speaker, importance, and keywords.

8. The apparatus of claim 1, wherein the graphical user interface of the participant devices allows a participant to view information relating to the conference and catch up to a live mode of the conference by bypassing portions of information.

9. The apparatus of claim 1, wherein conference information can be marked as important using the graphical user interface.

10. The apparatus of claim 9, wherein, when reviewing conference information on the one or more recording databases, a participant is not allowed to bypass the conference information indicated as important.

11. The apparatus of claim 9, wherein a speed of playback in a catch-up mode is determined by an amount of time to catch up or a confidence of an importance of portions of the recorded conference.

12. A system having a catch up feature, the system comprising:
- a network;
- a participant device;
- a conferencing system in communication via the network with the participant device and a plurality of other participant devices to connect the plurality of participant devices to a conference; and
- one or more recording databases, for recording the conference, being in communication via the network,
- wherein the participant device includes a graphical user interface that indicates a status of one or more of the other participant devices to show whether the other participant devices are participating in a live mode or a catch-up mode to the conference and indicates the portions of the recording that the other participant devices in the catch-up mode are currently reviewing.

13. The system of claim 12, wherein the conference is either an audio conference or a videoconference.

14. The system of claim 12, wherein a first participant device transmits a request for one or more other participant devices to join a live mode of the conference.

15. The system of claim 12, wherein the plurality of participant devices comprises the one or more recording databases.

16. The system of claim 12, wherein the one or more recording databases are remote from the plurality of participant devices.

17. The system of claim 12, wherein the graphical user interface further displays conference information selected from one or more of the group consisting of topic, speakers, active speaker, importance, and keywords.

18. The system of claim 12, wherein the graphical user interface of the participant device allows a participant to view information relating to the conference and catch up to a live mode of the conference by bypassing portions of information.

19. The system of claim 18, wherein a speed of playback in a catch-up mode is determined by an amount of time to catch up or a confidence of an importance of portions of the recorded conference.

20. The system of claim 12, wherein conference information can be marked as important using the graphical user interface.

* * * * *